(12) United States Patent
Choi et al.

(10) Patent No.: US 10,136,401 B2
(45) Date of Patent: Nov. 20, 2018

(54) APPARATUS AND METHOD FOR ACHIEVING SYNCHRONIZATION IN WIRELESS COMMUNICATION SYSTEM

(71) Applicant: Samsung Electronics Co., Ltd., Suwon-si, Gyeonggi-do (KR)

(72) Inventors: Hyun-Kuk Choi, Suwon-si (KR); Kwang-Chul Kim, Seongnam-si (KR); Hun-Kee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 14/204,552

(22) Filed: Mar. 11, 2014

(65) Prior Publication Data
US 2014/0254583 A1 Sep. 11, 2014

(30) Foreign Application Priority Data
Mar. 11, 2013 (KR) .................. 10-2013-0025703

(51) Int. Cl.
*H04W 56/00* (2009.01)

(52) U.S. Cl.
CPC ................. *H04W 56/001* (2013.01)

(58) Field of Classification Search
CPC .................................................. H04W 56/001
See application file for complete search history.

(56) References Cited

U.S. PATENT DOCUMENTS

| | | | |
|---|---|---|---|
| 6,754,500 B1 | 6/2004 | He | |
| 7,873,377 B1 * | 1/2011 | Cocos | H04W 48/16 370/310 |
| 2002/0090923 A1 * | 7/2002 | Muramoto | H04B 1/7085 455/192.2 |
| 2004/0203830 A1 * | 10/2004 | Rudowicz | H04B 1/1036 455/452.1 |
| 2005/0068979 A1 * | 3/2005 | Boer | H04L 27/0012 370/445 |
| 2005/0099987 A1 * | 5/2005 | Lester | H04W 48/12 370/343 |
| 2005/0169408 A1 | 8/2005 | Kim | |
| 2007/0206660 A1 | 9/2007 | Lifchuk | |
| 2008/0080463 A1 | 4/2008 | Stewart et al. | |
| 2008/0150700 A1 | 6/2008 | Lee et al. | |
| 2009/0279480 A1 * | 11/2009 | Rosenqvist | H04L 1/1887 370/328 |
| 2011/0007730 A1 | 1/2011 | Han et al. | |
| 2011/0117911 A1 * | 5/2011 | Narang | H04W 48/16 455/434 |

(Continued)

FOREIGN PATENT DOCUMENTS

EP 1221774 A1 7/2002

*Primary Examiner* — Anh Vu H Ly
*Assistant Examiner* — Andullahi Ahmed
(74) *Attorney, Agent, or Firm* — Jefferson IP Law, LLP

(57) ABSTRACT

A method of operating a terminal that is related to achieving synchronization in a wireless communication system is provided. The method includes receiving signals with a bandwidth comprising a plurality of channels, selecting at least one channel group to attempt to detect based on radio frequency level per a reception signal, wherein the channel group denotes a set of channels that belongs to one bandwidth, and performing a synchronization procedure on each of channels that belong to the at least one channel group selected.

18 Claims, 10 Drawing Sheets

(56) References Cited

U.S. PATENT DOCUMENTS

| | | | |
|---|---|---|---|
| 2011/0275402 A1 | 11/2011 | Charipadi et al. | |
| 2012/0033571 A1* | 2/2012 | Shimezawa | H04B 7/026 370/252 |
| 2012/0051265 A1* | 3/2012 | Shen | H04L 5/0035 370/254 |
| 2012/0140709 A1* | 6/2012 | Hou | H04W 56/0015 370/328 |
| 2012/0195282 A1* | 8/2012 | Choi | H04L 5/0048 370/329 |
| 2012/0224651 A1* | 9/2012 | Murakami | H04L 25/03171 375/295 |
| 2012/0295564 A1* | 11/2012 | Chen | H04B 1/28 455/293 |
| 2013/0039181 A1* | 2/2013 | Chao | H04W 48/16 370/235 |
| 2013/0235882 A1* | 9/2013 | Chen | H04L 41/0816 370/432 |
| 2013/0244673 A1* | 9/2013 | Anand | H04W 24/02 455/450 |
| 2015/0223265 A1* | 8/2015 | Fwu | H04W 52/04 370/329 |

\* cited by examiner

APPARATUS AND METHOD FOR ACHIEVING SYNCHRONIZATION IN WIRELESS COMMUNICATION SYSTEM

CROSS-REFERENCE TO RELATED APPLICATION(S)

This application claims the benefit under 35 U.S.C. § 119(a) of a Korean patent application filed on Mar. 11, 2013 in the Korean Intellectual Property Office and assigned Ser. No. 10-2013-0025703, the entire disclosure of which is hereby incorporated by reference.

TECHNICAL FIELD

The present disclosure relates to a wireless communication system. More particularly, the present disclosure relates to a technology for scanning a channel in a wireless communication system and achieving synchronization.

BACKGROUND

A wireless communication system transmits and receives a wireless signal by using an assigned frequency resource. In general, a system divides and uses a frequency resource into so-called channel units. For example, in the case of a Global System for Mobile communications (GSM) system, channels are defined as in Table 1 below.

TABLE 1

| Band | Uplink Sub-Band [MHz] | Downlink Sub-Band [MHz] | Number of Carriers |
| --- | --- | --- | --- |
| GSM 450 | 450.4-457.6 | 460.4-467.6 | 35 |
| GSM 480 | 478.8-486 | 488.8-496 | 35 |
| GSM 850 | 824-849 | 869-894 | 124 |
| GSM 900 | 890-915 | 935-960 | 124 |
| EGSM 900 | 880-915 | 925-960 | 174 |
| RGSM 900 | 876-915 | 921-960 | 194 |
| DCS 1800 | 1710-1785 | 1805-1880 | 374 |
| PCS 1900 | 1850-1910 | 1930-1990 | 299 |

If a user terminal is powered on, available or accessible channels are scanned, synchronization is achieved in at least one channel that is determined optimal, and then the user terminal accesses a base station. An example of a process of achieving the synchronization of the terminal is briefly described with reference to FIG. 1.

FIG. 1 shows a process of achieving synchronization in a wireless communication system according to the related art.

Referring to FIG. 1, a terminal is powered on in operation 101, and monitors the Radio Frequency (RF) level of each channel through a channel scan in operation 103. Subsequently, the terminal selects a channel having the highest RF level in operation 105, scans the Frequency Correction Channel (FCCH) of the selected channel in operation 107, and determines whether the FCCH is detected, in operation 109. If the FCCH is detected, the terminal scans a Synchronization Channel (SCH) in operation 111 and determines whether the SCH is detected, in operation 113. Since the SCH detection means that synchronization is achieved, the terminal ends this procedure. On the contrary, if the FCCH is not detected in operation 109 or the SCH is not detected in operation 113, the terminal selects a channel having the next priority RF level in operation 115 and returns to operation 107.

As discussed with reference to FIG. 1, measuring RF levels for all channels that are used in a system is needed to achieve synchronization. Since channels are defined on different frequencies, the terminal repetitively measures RF levels while changing the reception band of an RF receiver. The terminal may control the reception band by adjusting a Phase Locked Loop (PLL). In this case, since the adjustment of the PLL is hardware controlled, a certain time is needed for the adjustment and stabilization. Thus, as the number of channels increases, a time needed for channel scan becomes long. For example, referring to Table 1, there are hundreds of channels in the case of GSM system. When approximately 11 frames are needed for one channel scan, a time corresponding to thousands of frames is needed to scan all channels.

As described above, if the terminal is powered on, a long time is needed to scan channels. Thus, after the terminal is powered on, a user may not use a service for a long time. Moreover, as a time taken to scan becomes long, the reliability of a previously scanned RF level decreases. Thus, alternatives for decreasing times taken to scan channels and achieve synchronization are needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for achieving synchronization in a wireless communication system.

Another aspect of the present disclosure is to provide an apparatus and method for decreasing times taken to scan channels and achieve synchronization in a wireless communication system.

Another aspect of the present disclosure is to provide an apparatus and method for simultaneously performing scans on a plurality of channels in a wireless communication system.

Another aspect of the present disclosure is to provide an apparatus and method for minimizing the number of times the reception band of a Radio Frequency (RF) receiver is changed in a channel scan in a wireless communication system.

In accordance with an aspect of the present disclosure, a method of operating a terminal in a wireless communication system is provided. The method includes receiving signals with a bandwidth comprising a plurality of channels, selecting at least one channel group to attempt to detect based on RF levels for each of reception signals, wherein the channel group denotes a set of channels that belongs to one bandwidth, and performing a synchronization procedure on each of channels that belong to the at least one channel group selected.

In accordance with another aspect of the present disclosure, a terminal apparatus in a wireless communication system is provided. The terminal apparatus includes a RF processing unit configured to receive signals with a bandwidth that comprises a plurality of channels, and a base-band processing unit configured to select at least one channel group to attempt to detect based on RF levels for each of reception signals, wherein the base-band processing unit performs a synchronization procedure on each of channels that belong to the at least one channel group selected, and wherein the channel group denotes a set of channels that belong to one bandwidth.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A technology to decrease times taken to scan channels and achieve synchronization in a wireless communication system will be described below.

Before describing the present disclosure, channel scans and searches will be described by using a Global System for Mobile communications (GSM) system.

Firstly, a terminal adjusts a Radio Frequency (RF) reception filter to a frequency of a channel to be scanned and receives a signal from the channel. Subsequently, the terminal performs a synchronization procedure on a channel having an RF level equal to or larger than a certain value, such as a channel from which energy equal to or greater than a certain threshold is detected. In particular, the terminal down-converts the reception signal to a base-band signal and determines whether a Frequency Burst (FB) is received. If the FB is detected, the terminal attempts to detect a synchronous signal for a corresponding channel. Here, the FB is defined as shown in FIG. 2.

Figure 1:
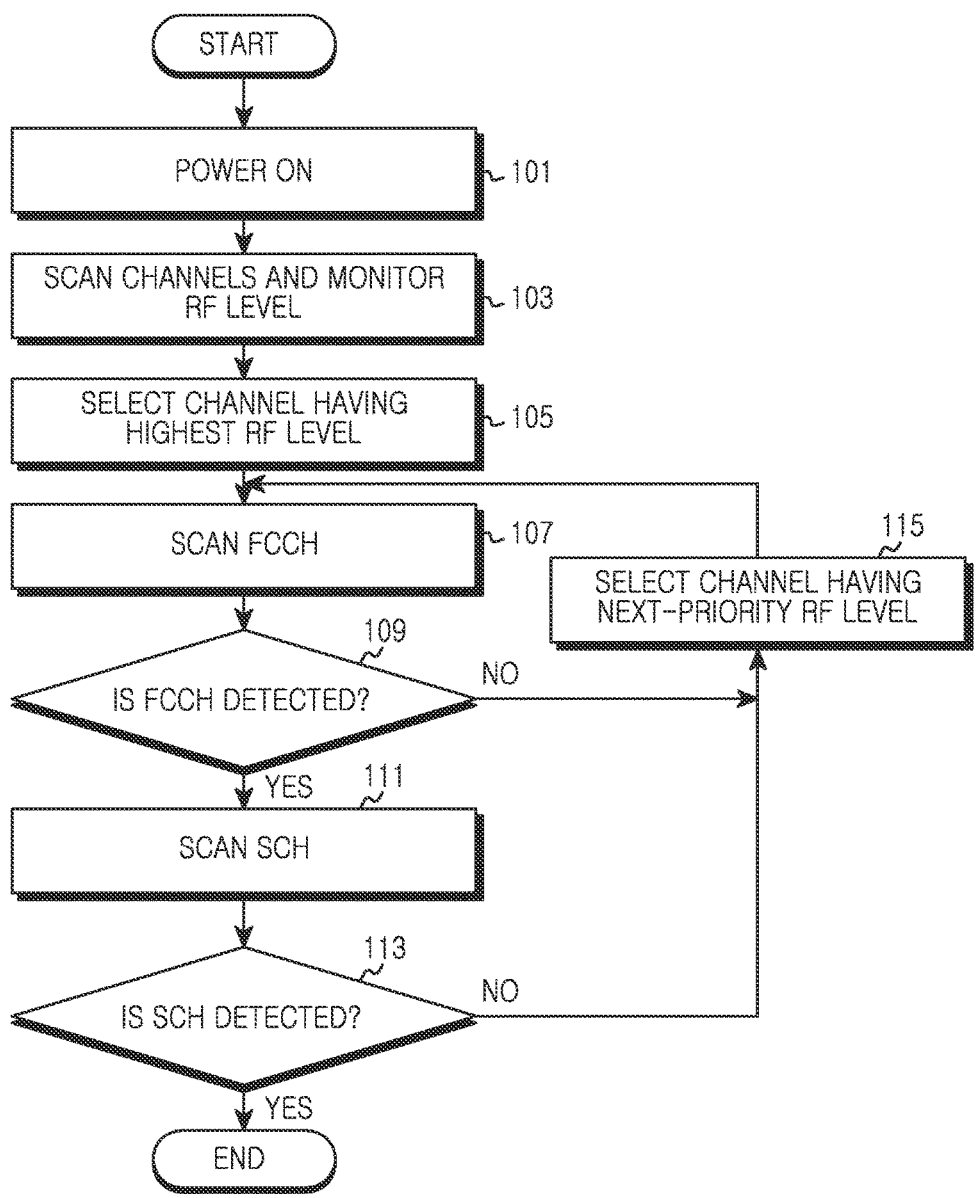
FIG. 1 is a flow chart of a process of achieving synchronization in a wireless communication system according to the related art.
Figure 2:
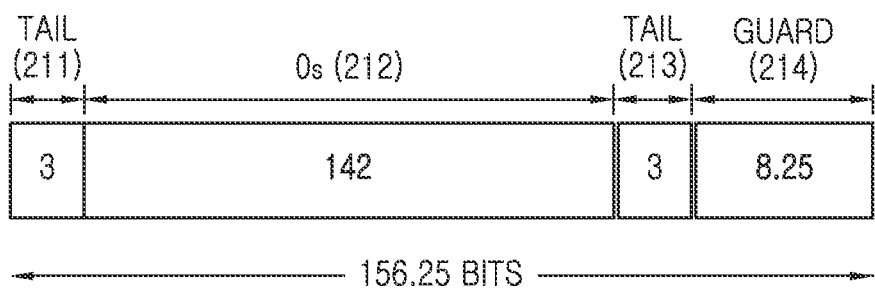
FIG. 2 is a diagram showing a configuration of Frequency Burst (FB) in a wireless communication system according to an embodiment of the present disclosure.

FIG. 2 shows a configuration of Frequency Burst (FB) in a wireless communication system according to an embodiment of the present disclosure.

Referring to FIG. 2, the FB includes a 3-bit tail 211, 142-bit zero bits 212, a 3-bit tail 213, and an 8.25-bit guard 214. Since a Global System for Mobile communications (GSM) system uses a Gaussian filtered Minimum Shift Keying (GMSK) modulation, the modulated signal of the zero bits 212 has a shape in which four constellation dots circulate. Thus, if the FB signal is received, it is detected in the same shape as that of FIG. 3.

Figure 3:
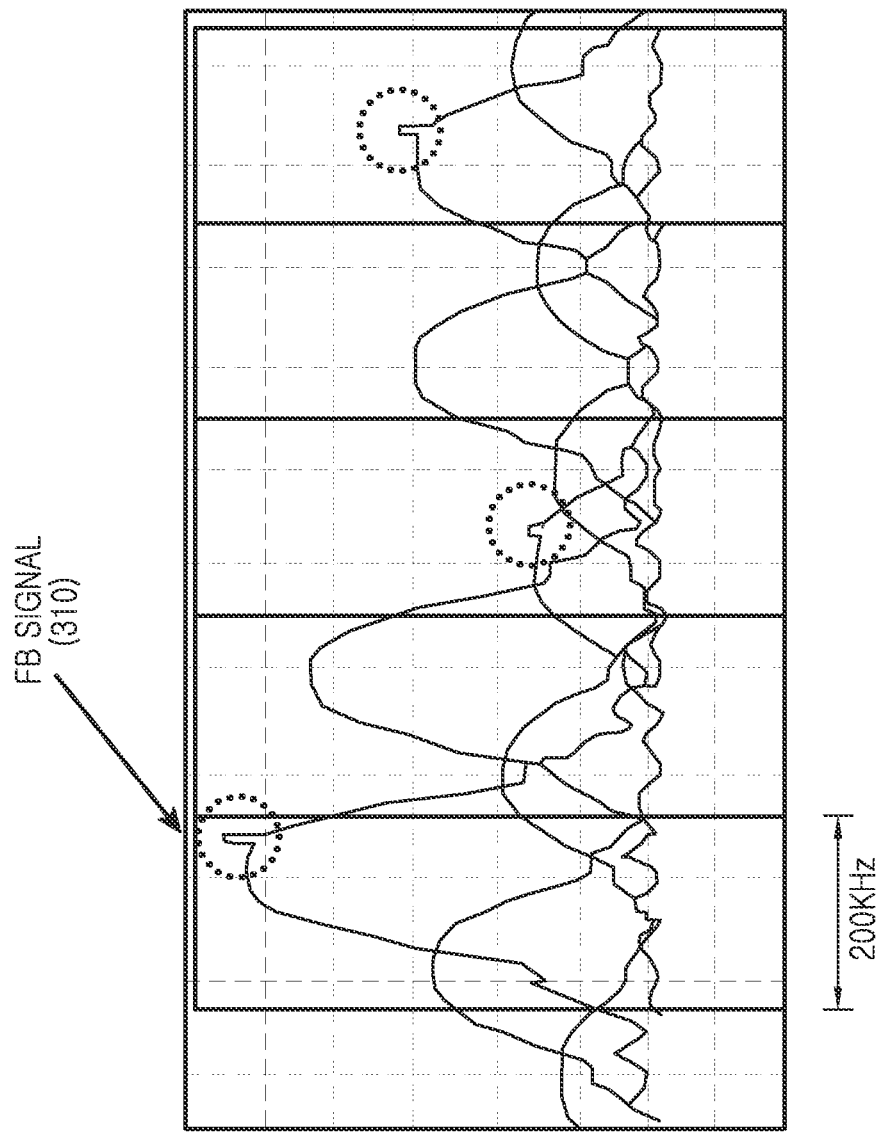
FIG. 3 is a diagram showing a reception shape of FB in a wireless communication system according to an embodiment of the present disclosure.

FIG. 3 shows a reception shape of FB in a wireless communication system according to an embodiment of the present disclosure.

Referring to FIG. 3, an FB signal 310 is detected which shows a peak value near about 67.7 kHz of each channel due to the zero bits 212. Thus, the terminal determines whether a signal similar to the FB signal 310 is detected, performs frequency correction, and searches channels. That is, the terminal detects a pattern similar to that of the FB signal 310 and detects a synchronous signal from a corresponding channel.

Typically, a user terminal generally includes one antenna and one RF chain. Here, the RF chain denotes a combination of a series of elements for processing RF signals, such as a filter, an amplifier, and a mixer. However, due to the recent introduction of a Multiple Input Multiple Output (MIMO) technique, cases where the terminal also includes a plurality of antennas and a plurality of RF chains increase. Thus, the present disclosure shortens a channel scan time by using a plurality of RF chains.

In scanning channels, the terminal according to the embodiment of the present may independently control RF chains. In other words, when there are n RF chains, the terminal may receive signals from n different channels and simultaneously scan the n channels. Thus, a time taken to scan the channels may decrease to 1/n. For example, the terminal operates RF chains as shown in FIG. 4.

Figure 4:
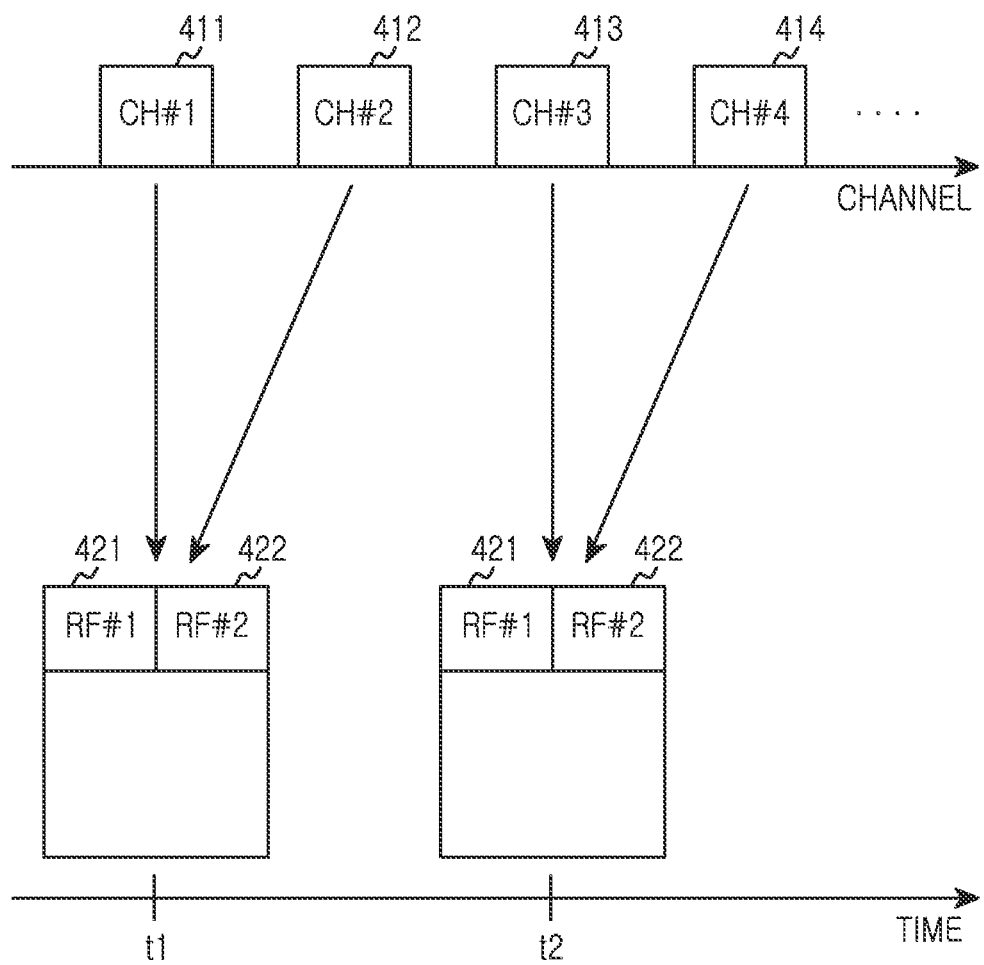
FIG. 4 is a diagram showing a channel scan using a plurality of Radio Frequency (RF) chains in a wireless communication system according to an embodiment of the present disclosure.

FIG. 4 shows a channel scan using a plurality of RF chains in a wireless communication system according to an embodiment of the present disclosure.

Referring to FIG. 4, the terminal has two RF chains, RF#1 421 and RF#2 422. Thus, at time t1, the terminal may simultaneously receive signals from two channels by receiving a signal from a channel CH#1 411 by using the RF#1 421 and a signal from a channel CH#2 412 by using the RF#2 422. Moreover, at time t2, the terminal may simultaneously receive signals from two channels by receiving a signal from a channel CH#3 413 by using the RF# 1 421 and a signal from a channel CH#4 414 by using the RF#2 422.

FIG. 4 shows a case where there are two RF chains. However, when the terminal has three or more RF chains, the terminal may simultaneously receive signals from three or more channels.

Moreover, the terminal according to the embodiment of the present disclosure may receive signals from two or more channels through one RF chain.

In general, a signal for one channel is received through one RF chain. This is performed by positioning the central frequency of a reception filter of an RF receiver on the center of the frequency band of a corresponding channel and setting the bandwidth of the reception filter so that the bandwidth includes one channel.

However, the terminal according to the embodiment of the present disclosure may receive signals for a plurality of channels at one time by positioning the central frequency of the reception filter on the center of the entire frequency band of corresponding channels and setting the bandwidth so that the bandwidth includes a plurality of channels. For example, the terminal receives a signal as shown in FIGS. 5A and 5B.

Figure 5A:
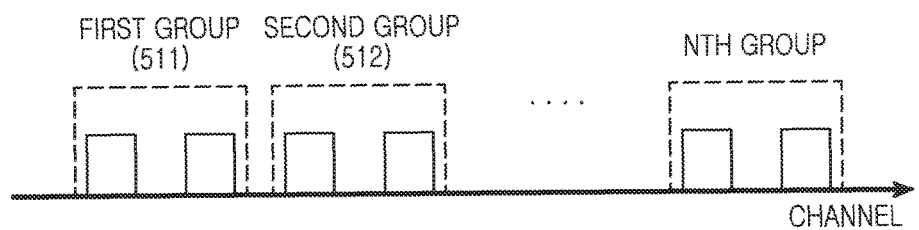
FIGS. 5A and 5B are diagrams showing the adjustment of a signal reception bandwidth in a wireless communication system according to an embodiment of the present disclosure.
Figure 5B:
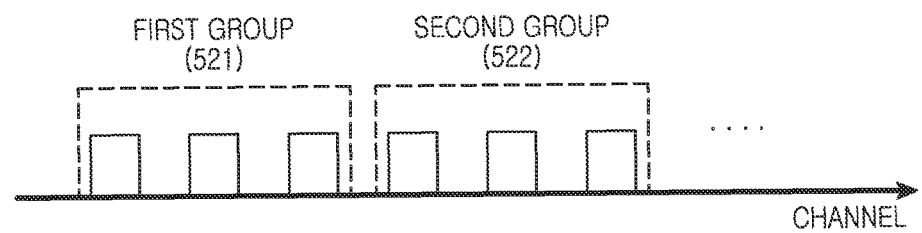

FIGS. 5A and 5B show the adjustment of a signal reception bandwidth in a wireless communication system according to an embodiment of the present disclosure.

Referring to FIGS. 5A and 5B, channels are grouped into a plurality of groups. In the case of FIG. 5A, two channels are included in one group. Thus, a terminal may set the bandwidth of a reception filter of an RF receiver to a size including two channels and position the central frequency at the center of two channels to be able to simultaneously receive signals from two channels. In other words, by using one RF chain, the terminal receives signals from two channels belonging to a first group 511 and signals from two channels belonging to a second group 512 next time. That is, the terminal may receive signals for four channels just by changing a reception bandwidth once. In the case of FIG. 5B, three channels belong to one group. Thus, by using one RF chain, the terminal receives signals from three channels belonging to a first group 521 and signals from three channels belonging to a second group 522 next time. In this case, the terminal may receive signals for six channels just by changing a reception bandwidth once. Here, how many channels one group includes may depend on particular various embodiments and on the performance of an RF receiver.

In a case where the RF receiver simultaneously receives signals from a plurality of channels as described with reference to FIGS. 5A and 5B, a signal processing process different from that of a case where a signal is received from one channel is needed. After receiving signals from a plurality of channels through an RF chain, the terminal performs synchronization procedure s several times on the signals received through one reception operation. For example, when two channels belong to one group as shown in FIG. 5A, the terminal attempts to perform two synchronization procedure s by using a reception signal for the first group 511. Here, the synchronization procedure will be described below in detail with reference to FIG. 6.

Figure 6:
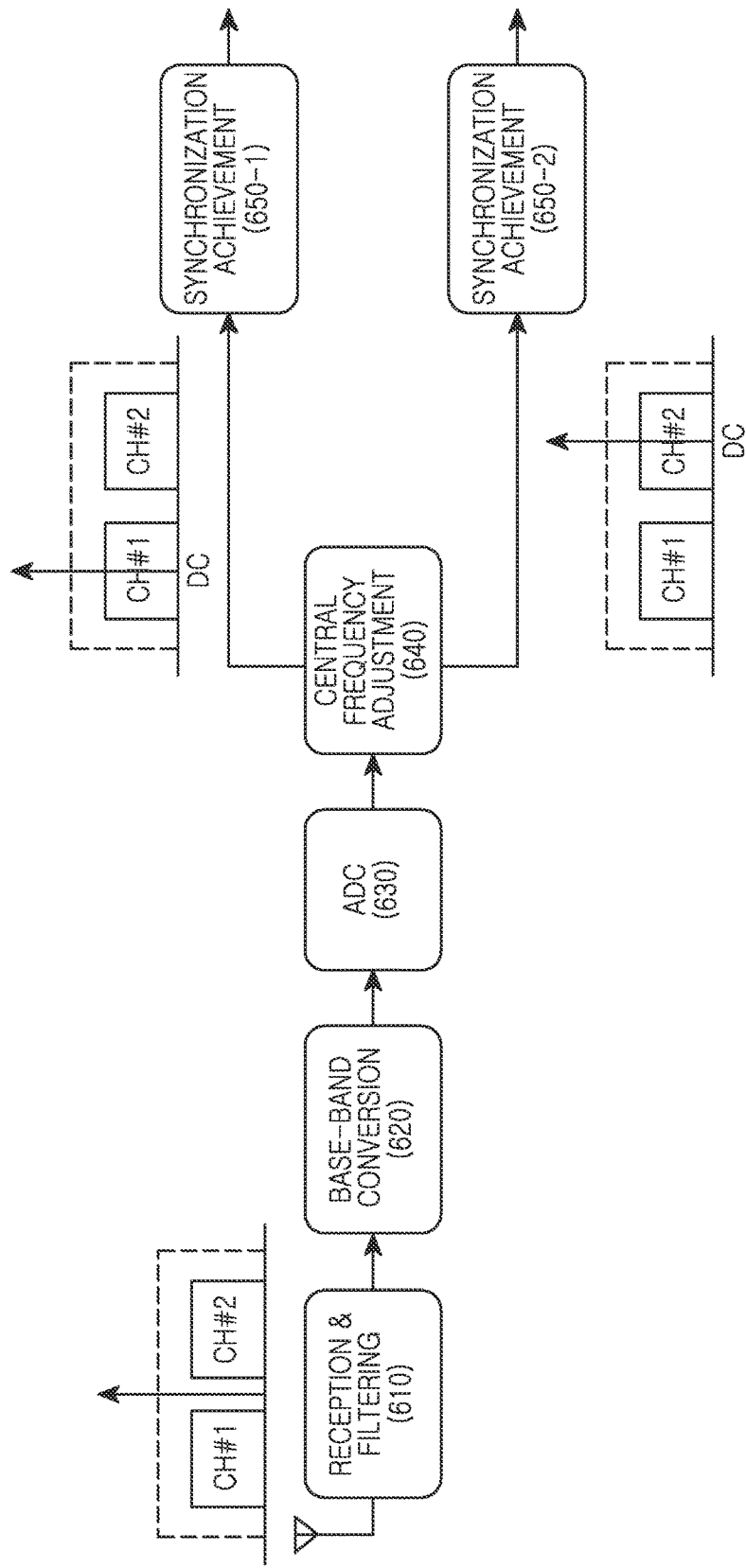
FIG. 6 is a diagram showing synchronization achievement through the adjustment of a signal reception bandwidth in a wireless communication system according to an embodiment of the present disclosure.

FIG. 6 shows synchronization achievement through the adjustment of a signal reception bandwidth in a wireless communication system according to an embodiment of the present disclosure.

Although FIG. 6 shows only processes required for describing the present disclosure, general synchronization procedure s may further include processes other than those shown in FIG. 6. Referring to FIG. 6, an initial RF signal is received via reception and filtering 610. In this case, in order for the bandwidth of the reception and filtering 610 to include two channels, the central frequency is set to be positioned at the center of two channels. Subsequently, the RF signal is down-converted into a base-band signal via base-band conversion 620 and converted into a digital signal via Analog to Digital Conversion (ADC) 630. If the RF reception signal is converted into the base-band signal, a Direct Current (DC) is positioned at the center of the two channels. Thus, before attempting the synchronization procedure, the position of the DC is moved to the center of each channel through central frequency adjustment 640. Thus, as the result of the central frequency adjustment 640, two outputs occur. Subsequently, synchronization achievement 650-1 and synchronization achievement 650-2 are respectively performed on the outputs. In the case of the GSM system, the synchronization achievement 650-1 and the synchronization achievement 650-2 include frequency correction through the detection of an FB signal.

Referring to FIG. 6, the central frequency adjustment 640 is performed after the ADC 630. However, according to another embodiment of the present disclosure, the central frequency adjustment 640 may be performed before the ADC 630.

An embodiment of using a plurality of RF chains that is described with reference to FIG. 4 and an embodiment of adjusting a reception range of RF chains that is described with reference to FIGS. 5A, 5B, and 6 may be independently practiced. Moreover, both embodiments may be simultaneously practiced because they are not exclusive. Thus, if a terminal having N RF chains receives signals from M channels per one RF chain, the terminal may process signals for N×M channels for one reception operation.

The operation and configuration of a terminal that scans channels and achieves synchronization as described above will be described below in detail with reference to the accompanying drawings.

Figure 7:
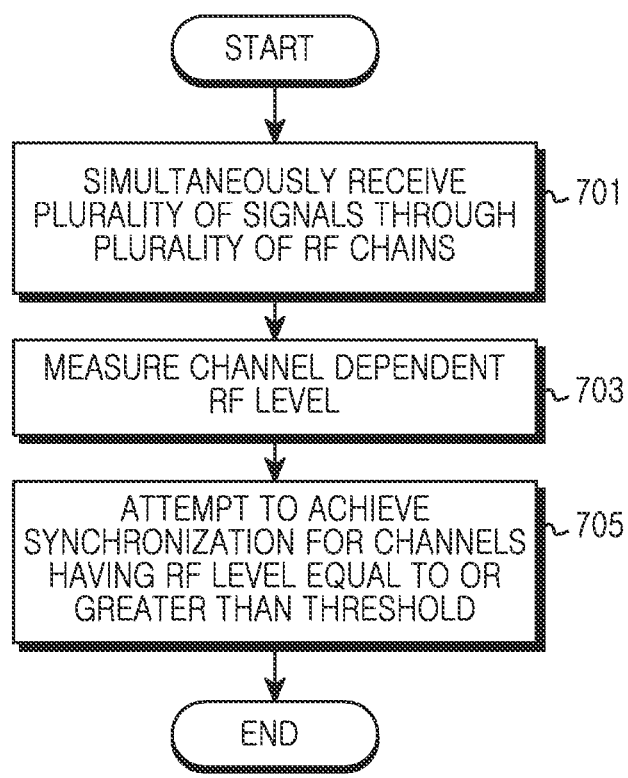
FIG. 7 is a flow chart of an operational procedure of a terminal in a wireless communication system according to an embodiment of the present disclosure.

FIG. 7 shows an operational procedure of a terminal in a wireless communication system according to an embodiment of the present disclosure.

Referring to FIG. 7, the terminal simultaneously receives signals from a plurality of channels through a plurality of RF chains in operation 701. In other words, the terminal controls the plurality of RF chains so that the RF chains receive signals from different channels respectively and thus the terminal simultaneously receives signals from channels corresponding to up to the number of RF chains.

Subsequently, the terminal proceeds to operation 703 to measure RF levels for each of channels on the basis of signals received through the plurality of RF chains. The RF level includes an energy value of an RF signal. The operations 701 and 703 are repetitively performed until all RF level measurements on channels that belong to a scan target are completed. That is, the terminal repeats signal reception and RF level measurements while changing the reception band of the plurality of RF chains.

Subsequently, the terminal proceeds to operation 705 to perform a synchronization procedure on channels that have RF levels equal to or larger than a threshold. The synchronization procedure includes a procedure in which a predefined specific signal is detected. For example, in the case of the GSM system, the synchronization procedure may include a procedure in which the pattern of the FB signal as shown in FIG. 3 is detected. Moreover, the synchronization procedure may include a procedure in which a synchronous signal is detected.

Figure 8:
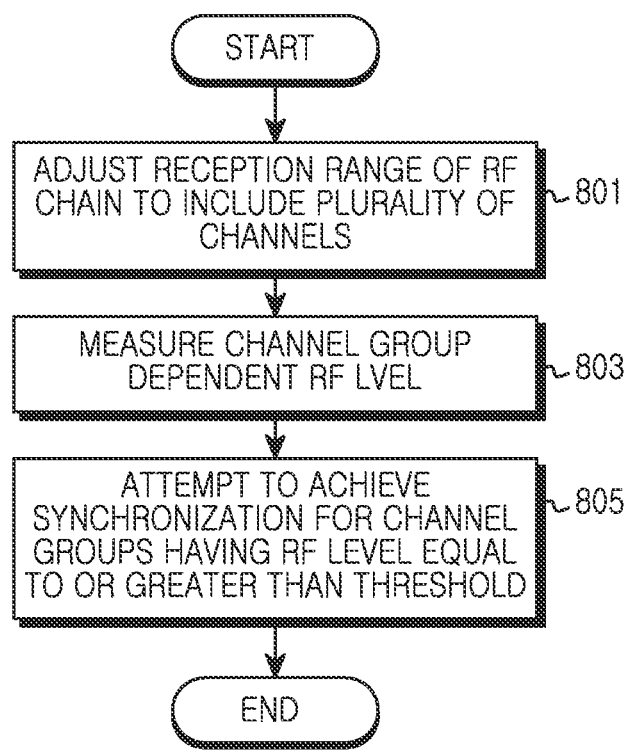
FIG. 8 is a flow chart of an operational procedure of a terminal in a wireless communication system according to another embodiment of the present disclosure.

FIG. 8 is a flow chart of an operational procedure of a terminal in a wireless communication system according to another embodiment of the present disclosure.

Referring to FIG. 8, the terminal adjusts the reception range of an RF chain to include a plurality of channels in operation 801. For example, the terminal may set the bandwidth of an RF reception filter to a value equal to or greater than a sum of the bandwidths of a plurality of channels to be able to adjust the reception range. In this case, the terminal sets the central frequency of the RF reception filter to the center of the plurality of channels. The terminal may use only one RF chain or a plurality of RF chains. In this case, the present disclosure calls a set of a plurality of neighboring channels that belongs to the reception range, 'a group of channels'.

Subsequently, the terminal proceeds to operation 803 to measure RF levels for each of channel groups. The RF level includes an energy value of an RF signal. That is, in the case of the embodiment as shown in FIG. 8, not the RF levels per the channel but the RF levels for each of channel groups is used unlike FIG. 7. Operation 803 is repetitively performed until all RF level measurements on channels that belong to a scan target are completed. That is, the terminal repeats signal reception and RF level measurements while changing the reception band of the RF chain.

Subsequently, the terminal proceeds to operation 805 to perform synchronization procedure s on channel groups that have RF levels equal to or larger than a threshold. The synchronization procedure includes a procedure in which a predefined specific signal is detected. For example, in the case of the GSM system, the synchronization procedure may include a procedure in which the pattern of the FB signal as shown in FIG. 3 is detected. Moreover, the synchronization procedure may include a procedure in which a synchronous signal is detected. In this case, since the channel group includes a plurality of channels, the synchronization procedure of operation 805 includes synchronization procedure s for single channel.

Figure 9:
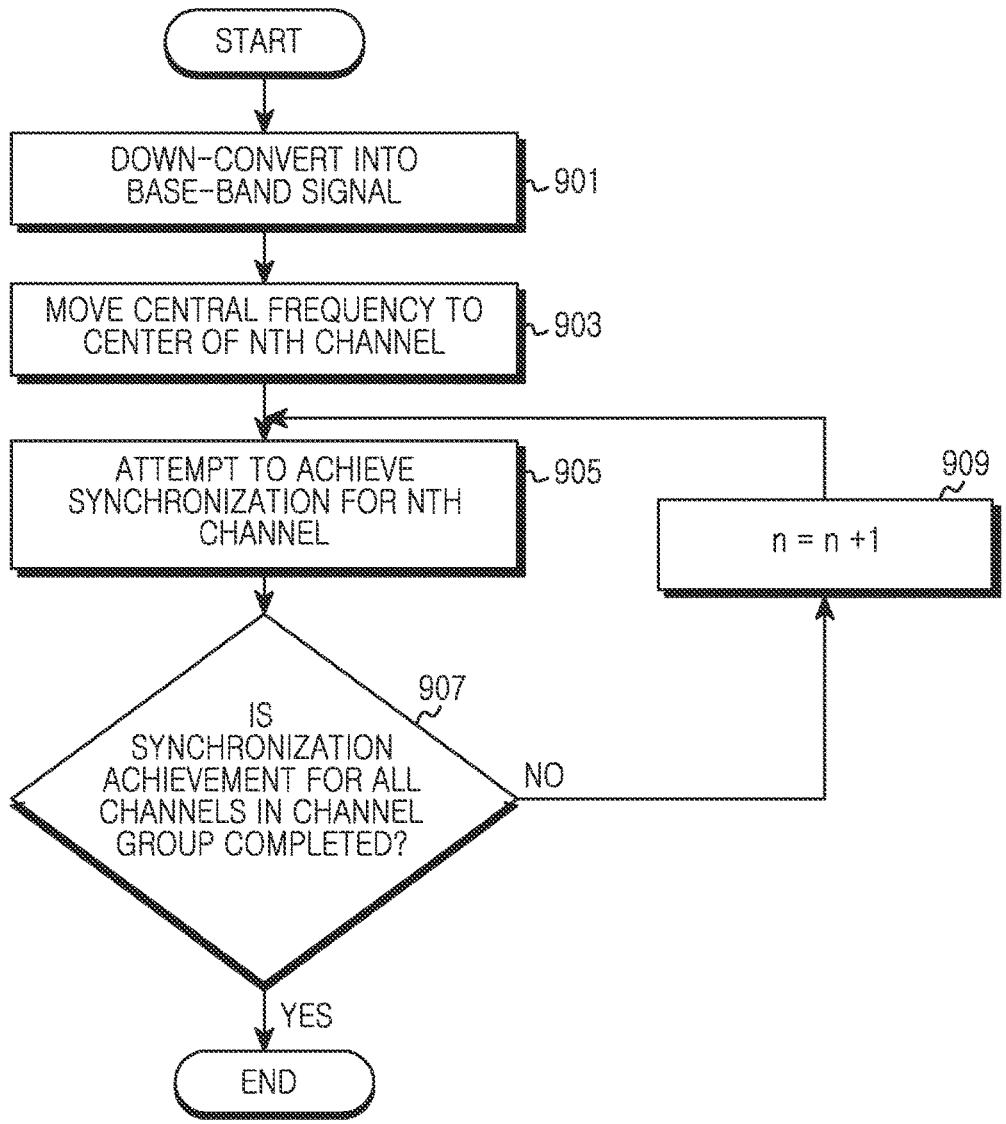
FIG. 9 is a flow chart of an operational procedure of a terminal in a wireless communication system according to another embodiment of the present disclosure.

FIG. 9 is a flow chart of an operational procedure of a terminal in a wireless communication system according to another embodiment of the present disclosure. FIG. 9 is an embodiment of operation 805 of FIG. 8 and shows a synchronization procedure for one channel group. If there is a plurality of channel groups, the terminal may repetitively perform the procedure described below.

Referring to FIG. 9, the terminal down-converts a reception signal of one channel group into a base-band signal in operation 901. In this case, the terminal may further perform an operation of converting the base-band signal into a digital signal.

Subsequently, the terminal proceeds to operation 903 to move the central frequency of the base-band signal, namely, DC to the center of an nth channel. Here, n is initialized to 1 when this procedure starts, and has up to the number of channels that belong to one channel group, through operation 909. Depending on whether conversion into a digital signal is performed in operation 901, the movement of the central frequency may be performed in an analog domain or a digital domain.

After moving the central frequency, the terminal proceeds to operation 905 to perform a synchronization procedure on the nth channel. The synchronization procedure includes a procedure in which a predefined specific signal is detected. For example, in the case of the GSM system, the synchronization procedure may include a procedure in which the pattern of the FB signal as shown in FIG. 3 is detected. Moreover, the synchronization procedure may include a procedure in which a synchronous signal is detected.

Subsequently, in operation 907, the terminal determines whether a synchronization procedure for all channels in the channel group is completed. If the synchronization procedure for the all channels is not completed, the terminal proceeds to operation 909 to increase n by one and then returns to operation 903. On the contrary, if the synchronization procedure for the all channels is completed, the terminal ends this procedure.

Subsequently, although not shown, the terminal receives system information after achieving the synchronization. The system information means a set of pieces of information that is necessarily required to access a Base Station (BS) with the terminal. Since the system information is transmitted through a fixed position on a frame, the terminal may determine the transmission position of the system information through a relative position from the synchronous signal.

Figure 10:
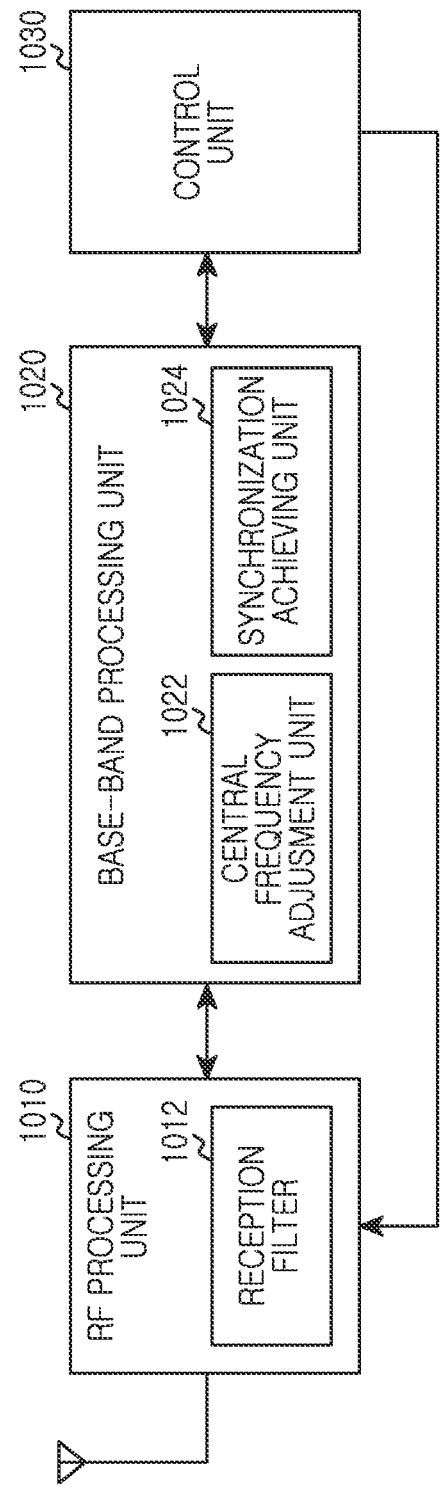
FIG. 10 is a block diagram of a terminal in a wireless communication system according to an embodiment of the present disclosure.

FIG. 10 shows a block diagram of a terminal in a wireless communication system according to an embodiment of the present disclosure.

Referring to FIG. 10, the terminal includes an RF processing unit 1010, a base-band processing unit 1020, and a control unit 1030.

The RF processing unit 1010 performs functions for transmitting and receiving a signal through a wireless channel, such as band conversion and amplification of a signal. That is, the RF processing unit 1010 up-converts a base-band signal provided from the base-band processing unit 1020 into an RF band signal, transmits the converted signal through an antenna, and down-converts an RF band signal received through the antenna into a base-band signal. For example, the RF processing unit 1010 may include a transmission filter, a reception filter 1012, an amplifier, a mixer, an oscillator, a Digital to Analog Converter (DAC), an Analog to Digital Converter (ADC), etc. Although FIG. 10 shows only one antenna, the terminal may include a plurality of antennas. Moreover, the RF processing unit 1010 may include a plurality of RF chains.

The base-band processing unit 1020 performs a conversion function between a base-band signal and a bit string according to a physical layer protocol of a system. For example, when transmitting data, the base-band processing unit 1020 generates complex symbols by encoding and modulating a transmission bit string. Moreover, when receiving data, the base-band processing unit 1020 recovers a received bit string through the demodulation and decoding of a base-band signal provided from the RF processing unit 1010. In particular, according to an embodiment of the present disclosure, the base-band processing unit 1020 includes a central frequency adjusting unit 1022 that adjusts the position of a DC frequency, and a synchronization achieving unit 1024 for a synchronization achieving procedure.

The control unit 1030 controls the overall operations of the terminal. For example, the control unit 1030 transmits and receives a signal through the base-band processing unit 1020 and the RF processing unit 1010. According to an embodiment, the control unit 1030 controls the RF processing unit 1010 and the base-band processing unit 1020 in order to simultaneously achieve synchronization for a plurality of channels. For example, the control unit 1030 controls the terminal so that the terminal performs the procedures as shown in FIGS. 7 and 8. The operation of the control unit 1030 according to an embodiment of the present disclosure is as follows.

According to an embodiment of the present disclosure, in a case where the RF processing unit 1010 includes a plurality of RF chains, the control unit 1030 sets and controls the reception filter 1012 of each of the plurality of RF chains to a band of different channels so that each of the plurality of RF chains simultaneously receives signals from different channels.

According to an embodiment of the present disclosure, the control unit 1030 sets the central frequency so that the central frequency is positioned at the center of a plurality of channels to allow the reception filter 1012 of the RF processing unit 1010 to include the plurality of channels. Thus, the control unit 1030 controls an operation so that signals from a plurality of channels are received through one RF chain. In addition, the control unit 1030 selects channels to perform a synchronization procedure based on RF levels for each of channel groups. Thus, the base-band processing unit 1020 performs a synchronization procedure on each channel while moving the central frequency of a base-band reception signal of a channel group, namely, DC to the center of each channel belonging to the channel group. In this case, the central frequency movement may be performed in an analog domain or a digital domain.

By simultaneously performing scans on a plurality of channels by using a plurality of RF chains in a wireless communication system, it is possible to decrease times taken to scan channels and achieve synchronization and enhance the reliability of channel scan results.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a terminal in a wireless communication system, the method comprising:
   receiving a signal for a channel group through a bandwidth comprising a plurality of channels composing the channel group;
   in response to a signal strength of the signal for the channel group being higher than a threshold, performing a synchronization on a first channel by adjusting a position of a direct current (DC) to a center of the first channel and detecting a first synchronous signal for the first channel; and
   performing the synchronization on a second channel by adjusting the position of the DC to a center of the second channel and detecting a second synchronous signal for the second channel,
   wherein the first channel and the second channel are comprised in the channel group.

2. The method of claim 1, wherein the receiving of the signal for the channel group comprises setting a bandwidth of a radio frequency (RF) reception filter to the bandwidth comprising the plurality of channels.

3. The method of claim 1, further comprising:
   down-converting the signal into a base-band signal;
   adjusting a central frequency of the base-band signal to the center of the first channel included in the channel group; and
   detecting a synchronous signal for the first channel.

4. The method of claim 3, wherein the adjusting of the central frequency is performed on an analog base-band signal.

5. The method of claim 3, wherein the adjusting of the central frequency is performed on a digital base-band signal.

6. The method of claim 1, further comprising:
   detecting a predefined signal for frequency correction; and
   detecting a synchronous signal.

7. The method of claim 1, further comprising, receiving signals through channel groups by using a plurality of radio frequency (RF) chains,
   wherein one RF chain of the plurality of RF chains receives a first signal through a first channel group of the channel groups while another RF chain of the plurality of RF chains receives a second signal through a second channel group of the channel groups.

8. A terminal in a wireless communication system, the terminal comprising:
   at least one transceiver configured to receive a signal for a channel group through a bandwidth comprising a plurality of channels composing the channel group; and
   at least one processor configured to:
      in response to a signal strength of the signal for the channel group being higher than a threshold, perform a synchronization on a first channel by adjusting a position of a direct current (DC) to a center of the first channel and detecting a first synchronous signal for the first channel, and
      perform the synchronization on a second channel by adjusting the position of the DC to a center of the second channel and detecting a second synchronous signal for the second channel,
wherein the first channel and the second channel are comprised in the channel group.

9. The terminal of claim 8, wherein the at least one processor is further configured to set a bandwidth of a radio frequency (RF) reception filter to the bandwidth comprising the plurality of channels.

10. The terminal of claim 8, wherein the at least one processor is further configured to:
    down-convert the signal into a base-band signal,
    adjust a central frequency of the base-band signal to the center of the first channel included in the channel group, and
    detect a synchronous signal for the first channel.

11. The terminal of claim 10, wherein the adjustment of the central frequency is performed on an analog base-band signal.

12. The terminal of claim 10, wherein the adjustment of the central frequency is performed on a digital base-band signal.

13. The terminal of claim 8, wherein the at least one processor is further configured to:
    detect a predefined signal for frequency correction, and
    detect a synchronous signal.

14. The terminal of claim 13, further comprising a radio frequency (RF) processor comprising a plurality of RF chains, the RF processor receiving signals through channel groups by using the plurality of RF chains, wherein one RF chain of the plurality of RF chains receives a first signal through a first channel group of the channel groups while another RF chain of the plurality of RF chains receives a second signal through a second channel group of the channel groups.

15. The method of claim 1, further comprising:
    determining a radio frequency (RF) level for the channel group based on the signal strength of the signal for the channel group.

16. The terminal of claim 8, wherein the at least one processor is further configured to:
    determine a radio frequency (RF) level for the channel group based on the signal strength of the signal for the channel group.

17. The method of claim 1, further comprising:
    down-converting the received signal to a base-band signal;
    determining whether a frequency burst is received; and
    upon determining that the frequency burst is received, determining that the signal strength is higher than the threshold.

18. The terminal of claim 8, wherein the at least one processor is further configured to:
    down-convert the received signal to a base-band signal,
    determine whether a frequency burst is received, and
    determine, upon determining that the frequency burst is received, that the signal strength is higher than the threshold.

* * * * *